United States Patent [19]
Duncan et al.

[11] Patent Number: 5,953,331
[45] Date of Patent: Sep. 14, 1999

[54] WIRELESS PACKET SYSTEM FOR EFFICIENT WIDE AREA BANDWIDTH UTILIZATION

[75] Inventors: Thomas Duncan, Naperville, Ill.; Richard Dennis Gitlin, Little Silver, N.J.; Thomas F. La Porta, Thornwood, N.Y.; Kazutaka Murakami, Freehold, N.J.; Krishan Kumar Sabnani, Westfield, N.J.; Anil S. Sawkar, Somerset, N.J.; David E. Smith, Elmhurst, Ill.

[73] Assignee: Lucent Technologies Inc., Murray Hill, N.J.

[21] Appl. No.: 08/925,876

[22] Filed: Sep. 9, 1997

[51] Int. Cl.[6] .................................................. H04L 12/20
[52] U.S. Cl. ............................ 370/352; 370/465; 370/545
[58] Field of Search ..................................... 370/328, 338, 370/465, 467, 468, 477, 391, 545, 352, 354, 358; 455/500, 561, 465, 557

[56] References Cited

U.S. PATENT DOCUMENTS

| | | | |
|---|---|---|---|
| 5,502,752 | 3/1996 | Averbuch et al. | 370/465 |
| 5,504,804 | 4/1996 | Widmark et al. | 455/414 |
| 5,764,644 | 6/1998 | Miska et al. | 370/465 |

*Primary Examiner*—Chau Nguyen
*Assistant Examiner*—Kenneth Vanderpuye
*Attorney, Agent, or Firm*—Thomas J. Bean

[57] ABSTRACT

A telecommunications system is arranged to efficiently route digital information from a mobile network to a Public Switched Telephone Network (PSTN) and vice versa by interposing a packet network between the mobile network and PSTN so that digital information originating from the wireless network at a first data rate may be forwarded over the packet network at that rate and then sent over a direct connection from the packet network to the PSTN at a second data rate expected by the PSTN. In this way the conversion of the digital information from the first to the second data rate is performed only when needed, i.e., at the ATM switch connected to the PSTN.

17 Claims, 9 Drawing Sheets

WIRELESS PACKET SYSTEM FOR EFFICIENT WIDE AREA BANDWIDTH UTILIZATION

FIELD OF THE INVENTION

The invention relates to the transmission of signals received from a wireless device at a nominal 8 kbps rate to a public switched telephone network and making efficient use of the available system bandwidth in doing so.

BACKGROUND OF THE INVENTION

In wireless systems, a wireless station typically transmits a frame of voice signals at a nominal 8 kbps (i.e., 8 kbps to 13 kbps) rate. If a wireless system conforms with a particular protocol, e.g., the well-known IS-95 protocol, then such a frame may be received by more than one base station as illustrated in FIG. 1. A base station, e.g., base stations BS 2-1 and/or BS 2-2, that receives a frame of signals supplies the frame and an associated signal-to-noise ratio (SN/R) value to a so-called Mobile Switching Center (MSC), e.g., MSC 5. MSC 5, in turn, directs the received frame to a conventional Frame Selector (FS) circuit 3. Frame selector 3 then selects the frame of signals having the highest S/N R value and outputs that frame to a conventional voice coder (vocoder) circuit 4. Voice Coder (VC) 4 converts ("upcodes") the frame of nominal 8 kbps voice signals transmitted by the wireless station, e.g., wireless station 1, to 64 kbps PCM coded signals and outputs the converted frame of signals to network 6 for delivery to an intended destination 7 (assuming that the routing for the frame had already been established).

Disadvantageously, an MSC (as well as a so-called Mobile Terminal Switching Center (MTSO)) converts voice signals that it receives at a nominal 8 kbps rate from a base station to 64 kbps PCM irrespective of the type of network that will receive the converted signals directly from the MSC. Because of this, system bandwidth is not used efficiently. For example, if network 6 happens to be another MSC and destination 7 is another wireless terminal, then even in that instance MSC 5 converts the 8 kbps signals to 64 kbps for delivery to network 6. Network 6 then re-converts the 64 kbps signals that it receives from MSC 5 to a nominal 8 kbps for delivery to wireless destination 7. Such conversion and re-conversion is clearly unnecessary overhead. It also impairs the quality of the voice signals. As another example, assume as shown in FIG. 2 that the route to destination 7 includes packet switches 8 and 9, in which the latter switch output signals to network 6 for delivery to destination 7. Here too MSC 5 using VC 4 converts the nominal 8 kbps signals outputted by FS 3 to a 64 kbps rate and supplies the result to packet switch 8. Packet switch 8, in turn, forms the signals into a packet and in accordance with its routing table delivers the packet to switch 9, which then unloads the contents of the packet for forwarding to PSTN network 6. However, there is no need to convert the nominal 8 kbps signals to 64 kbps signals at MSC 5 since a packet switch can readily handle 8 kbps traffic.

Accordingly, such unnecessary conversion or the conversion of the nominal 8 kbps signals at the wrong point in the network leads to inefficient use of the system bandwidth.

SUMMARY OF THE INVENTION

We deal with the foregoing problem and advance the relevant switching technology by converting the nominal 8 kbps signal to 64 kbps only when such conversion is needed and performing the conversion at a point along a connection that requires the signals to be at a 64 kbps rate, in accordance with an aspect of the invention. Thus, the conversion is not performed if it is not needed and is only performed at the "last minute" so to speak.

These and other aspects of the claimed invention will be appreciated from the ensuing detailed description and accompanying drawings.

DETAILED DESCRIPTION

Figure 1:
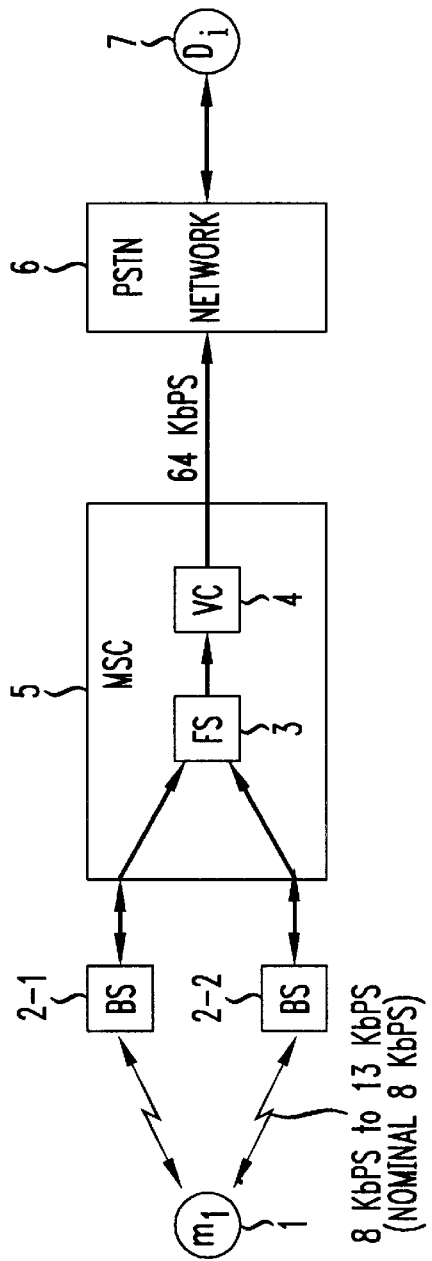
FIGS. 1 and 2 depict prior art systems.
Figure 2:
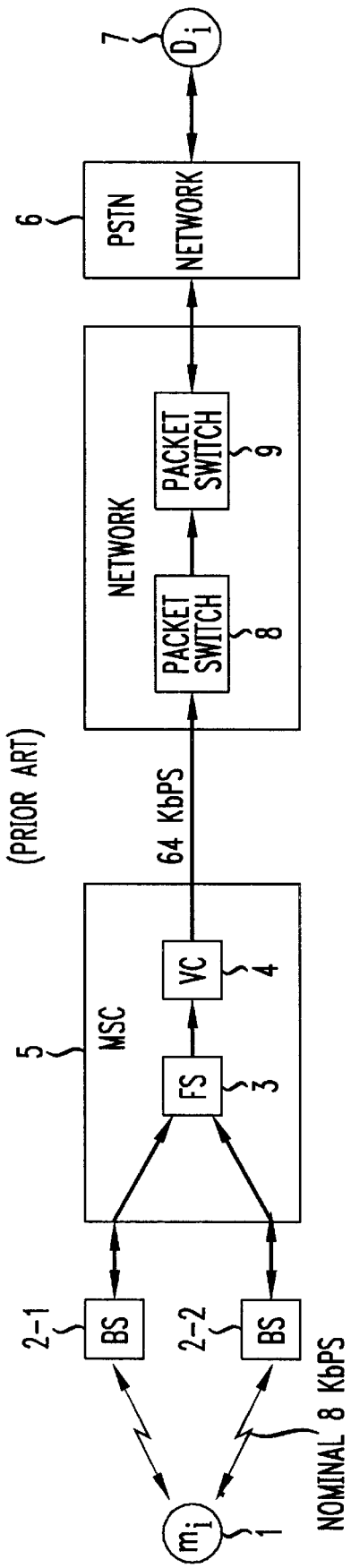
Figure 3:
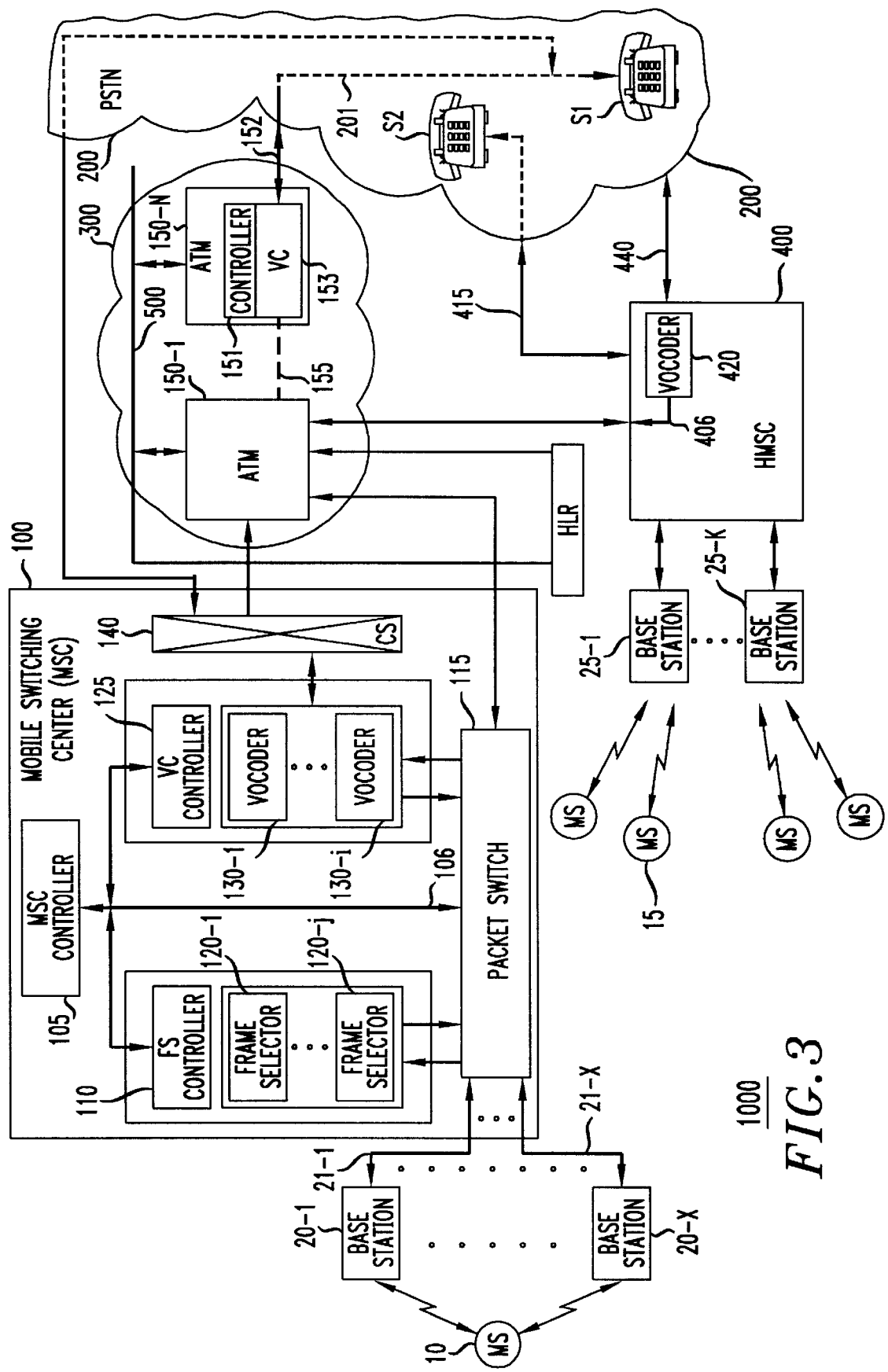
FIG. 3 shows in block diagram form a switching system in which the principles of the invention may be practiced.

A system 1000, FIG. 3, arranged in accordance with the principles of the invention, includes a plurality of base stations (BS) 20-1 through 20-x each serving in a conventional manner a plurality of mobile stations (MSs), e.g., MS 10. Assume that MS 10, as well as each of the base stations 20-1 through 20-x and MSC (mobile switching center) 100 operates in accordance with the well-known IS 95 protocol commonly referred to as CDMA. It is seen from the FIG. 3 that the base stations communicate with MS 10 via wireless communications and communicate with MSC 100 via wired communications, in which base stations 20-1 through 20-x connect to respective input port circuits (not shown) associated with packet switch 115 (which may be, for example, a conventional ATM packet switch) provisioned within MSC 100. Packet switch 115 extends such a port circuit to either a selected one of a plurality of frame selector circuits 120-1 through 120-j, a selected one of a plurality of vocoder circuits 130-1 through 130-i, or to an output port extending to, for example, another MSC, another network, e.g., packet switch network 300, etc., as will be explained below. The selection of a frame selector 120 is under the control of Frame Selector (FS) controller 110 responsive to receipt of a request from MSC controller 105 via bus 106. Similarly, The selection of a vocoder circuit 130 is under the control of VoCoder (VC) controller 125 responsive to receipt of a request from MSC controller 105.

The output side of the each of the frame selectors 120-1 through 120-j also connect to packet switch 115 as a way of inserting a frame selector into a connection. Similarly, the input and output of each of the vocoders 130 connect to packet switch 115 as a way of inserting a selected vocoder 130 into a connection. The output of each of the vocoders 130 also connect to switching fabric 140, e.g., a conventional circuit switched arrangement, which operates under control of MSC controller 105. In this way, MSC controller 105 may insert a vocoder 130 in a communication path extending directly to another network, for example, Public Switched Telephone Network PSTN) 200. Such a communication path may be, for example, path 515.

(It is noted that the foregoing description of MSC 100 may equally pertain to MSC 400.)

Figure 4:
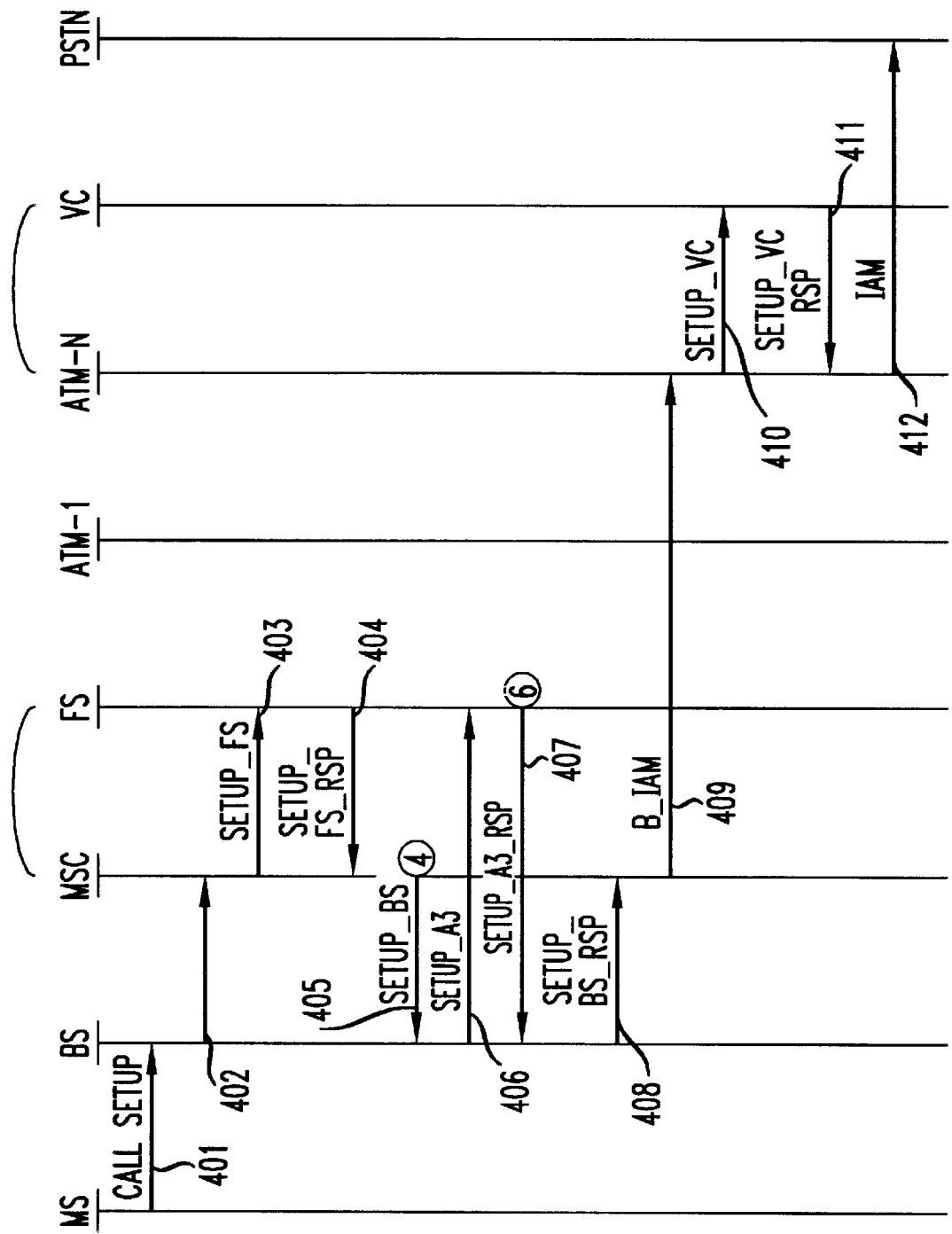
FIGS. 4 through 7 show call signaling flows illustrating the messages that the various switching elements of FIG. 3 exchange in the setting up of respective call connections.

In a first illustrative example, assume that a user at MS 10 places a call to wired station S1 served by PSTN 200. That is, the user in a conventional manner dials the telephone number associated with station S1 from MS 10. MS 10 in a conventional manner forms a so-called call setup message (message 401 in FIG. 4) containing, inter alia, the Mobile Identification Number (MIN) identifying station 10, the called party number and type of call, e.g., 8 kbps ADPCM voice. MS 10 then transmits the message 401 over the air to its associated base station, e.g., BS 20-1. BS 20-1 then forwards the message/frame (402) to MSC controller 105 via path 21-1, and a signaling channel provisioned in packet switch 115. Packet switch 115 outputs the content of the signaling channel to a port circuit assigned to MSC controller 105. MSC controller 105 processes the received frame(s) and determines the routing of the call from the called party number. Specifically, MSC controller 105 determines in a conventional manner that the called station is served by PSTN 200, which may be reached via a path within the ATM network 300 formed by ATM switches 150-1 through 150-n. For that case, then, MSC 100 determines that it does not require a vocoder and that the 8 Kbps ADPCM voice information may be supplied directly to ATM 150-1, in accordance with an aspect of the invention.

MSC controller 105 also determines in a conventional manner that the call is a IS-95 (CDMA) call, and, therefore, the same voice message/frame could be supplied by two different base stations during the call. MSC controller 105 selects a virtual path (VP) extending from the frame selector to ATM 150-n. Accordingly, MSC controller 105 directs via bus 106 FS controller 110 to select an idle one of the fame selectors, e.g., FS 120-1, and sends to controller 110 a setup_FS (frame selector) message 403 identifying the call type and the identity of the selected VP extending to ATM 150-n. FS controller 110, in turn, selects an idle frame selector, e.g., selector 120-1, as well as a circuit/channel (VC) in the identified VP and returns a response message 404 acknowledging that it will handle the call and containing, inter alia, the address of selector 120-1 and identity of the latter VC.

Message 404 also contains the identity of the selected frame selector 120-1 and address of controller 110, which are relayed by MSC controller 105 to base station 20-1 as a set-up message 405.

The bases station 20-1 and FS controller 110 then enter a so-called "handshaking mode" during which they "agree" to the ATM adaptation layer protocol that they will use to communicate with one another, as represented in the FIG. by setup_A3 message 406 and setup_A3_RSP message 407. The setup_BS_RSP message 408 that is returned to MSC 100 acknowledges the connection between the base station and MSC 100. MSC controller 105 of MSC 100 then forms a conventional Broadband Initial Address Message (B_IAM) 409 containing, inter alia, the type of call (8 kbps ADPCM), VPI/VCI, destination address (e.g., called party number (CPN)) and then supplies the message via packet switch 115 to ATM switch 150-1. ATM switch 150-1, based on the information contained in message 409, concludes that the message is being forwarded to another ATM switch in the associated network, i.e., switch 150-N, and therefore, in accordance with an aspect of the invention, does not interconnect a vocoder in the call path. ATM switch 150-1 then forms and forwards a B_IAM message to ATM switch 150-N via an associated signaling channel. For example, a channel within a signaling network 500, such as the well-known SS7 signaling network adapted for use in the network formed by ATM switches 150-1 through 150-N. (It is noted that one or more other ATM switches (not shown) may be interposed between switch 150-1 to switch 150-N, as is represented in the FIG. by the dashed line 155.)

Upon receipt of the B_IAM message, ATM switch 150-N determines from the called party number (CPN) in the message that the next hop in the call path is the PSTN network 200. Switch 150-N, therefore, concludes that it needs to interconnect a vocoder in the call path so that the 8 kbps ADPCM that it will receive may be converted to a 64 kbps rate before such signals are supplied to a PSTN switch(s) (represented by the dashed line 201) that will deliver the digitized voice to station S1 in analog form. Switch 150-N then selects an outgoing trunk to path 152 and sends a setup_VC message 410 to its associated VC controller 151. Message 410 includes, inter alia, the incoming VPI and VCI and outgoing Trunk Group Identification Number (TGID) of the selected trunk connecting to path 152. Controller 151 then selects an idle one of its associated vocoders, e.g., VC 153, as well as idle channel in the selected trunk to path 152. Controller 151 then acknowledges the 410 message by returning a setup_VC_RSP message 411 containing the identification number of the channel Circuit Identification Code (CIC) in the selected trunk group that will be used to forward the call to path/link 152. Switch 150-N then sends an initial address message (IAM) 412 containing, inter alia, the TGID/CIC, and CPN to PSTN 200 via outgoing path 152. PSTN 200 upon receipt of the message then completes the call connection to station S1. Thus, in accordance with an aspect of the invention, a vocoder is interconnected at a point which directly interfaces with the PSTN, and not before that point, as is done in prior switching schemes. Accordingly, then, the voice information is carried at a low-bit rate over most of the call connection, thereby conserving network bandwidth in accordance with the principles of the invention.

Figure 8:
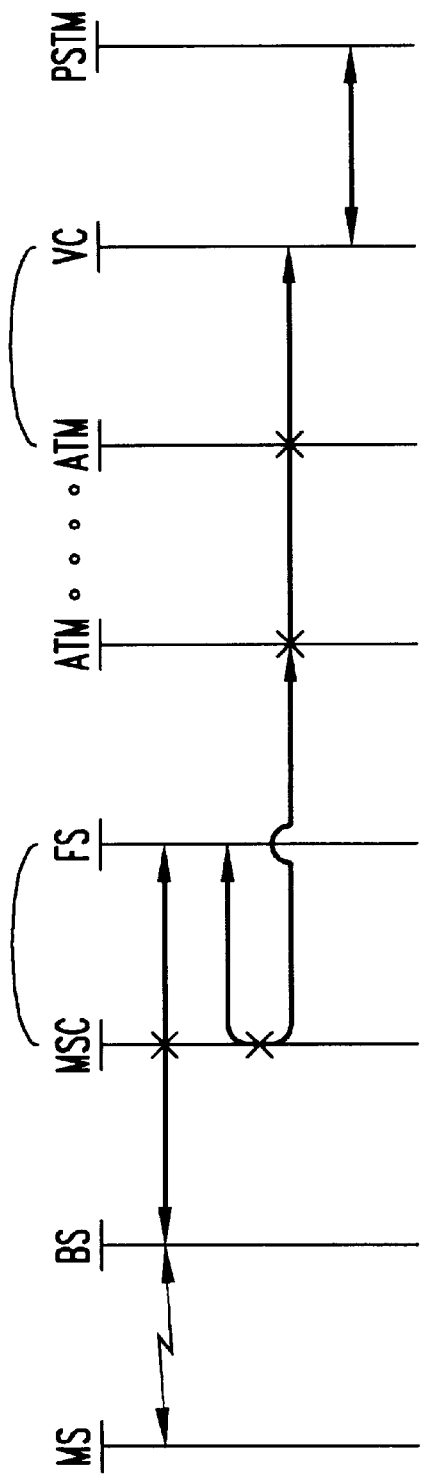
FIGS. 8 through 11 illustrate the connection segments which form the connections described in FIGS. 4 through 7, respectively.

An illustrative rendition of the segments forming the above-described connection is shown in FIG. 8. The lines extending between arrowheads indicate segments of the end-to-end connection. The endpoints of these segments terminate either at the air interface, ATM connection or connection to the PSTN. An "x" indicates a point at which ATM switching occurs.

Figure 5:
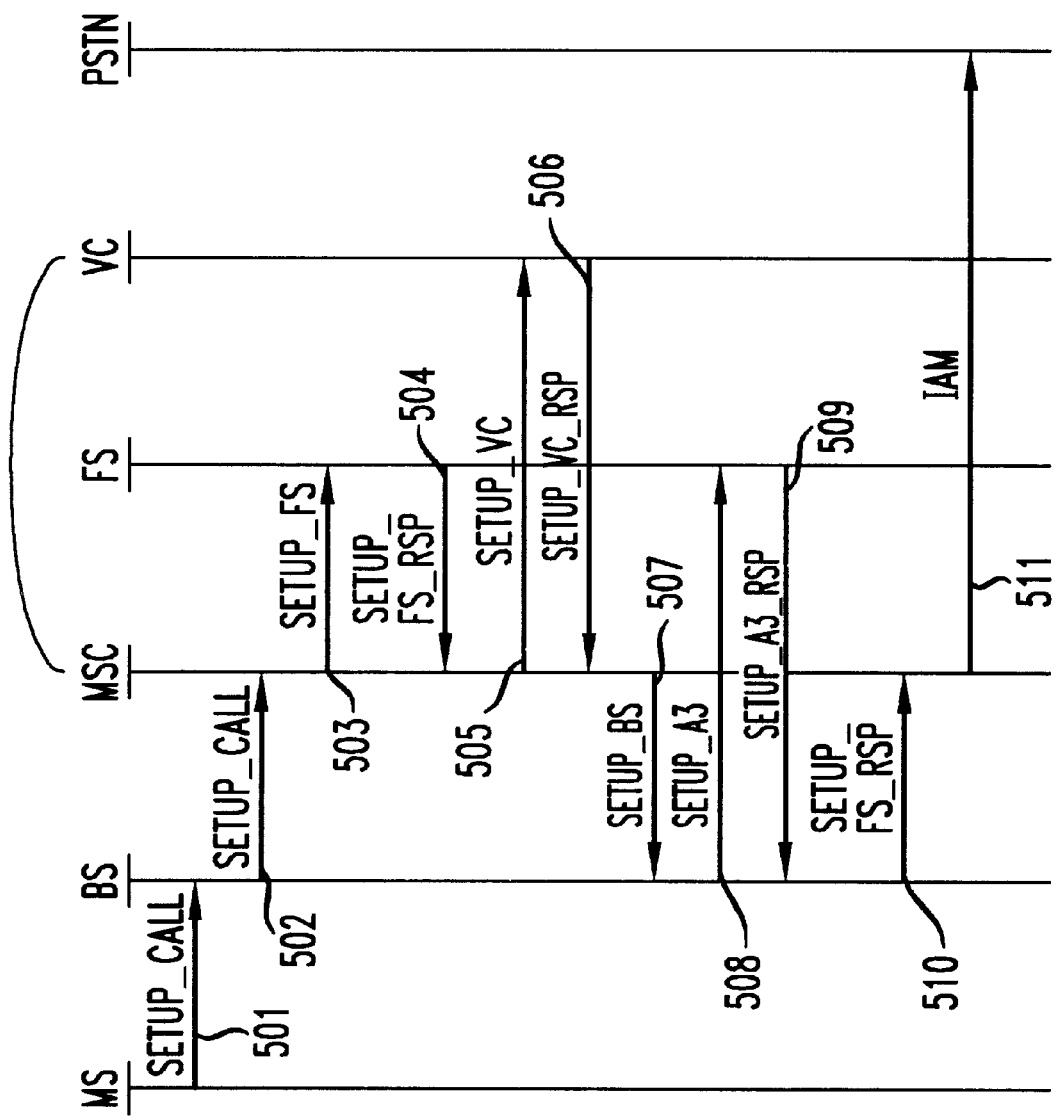
Figure 6:
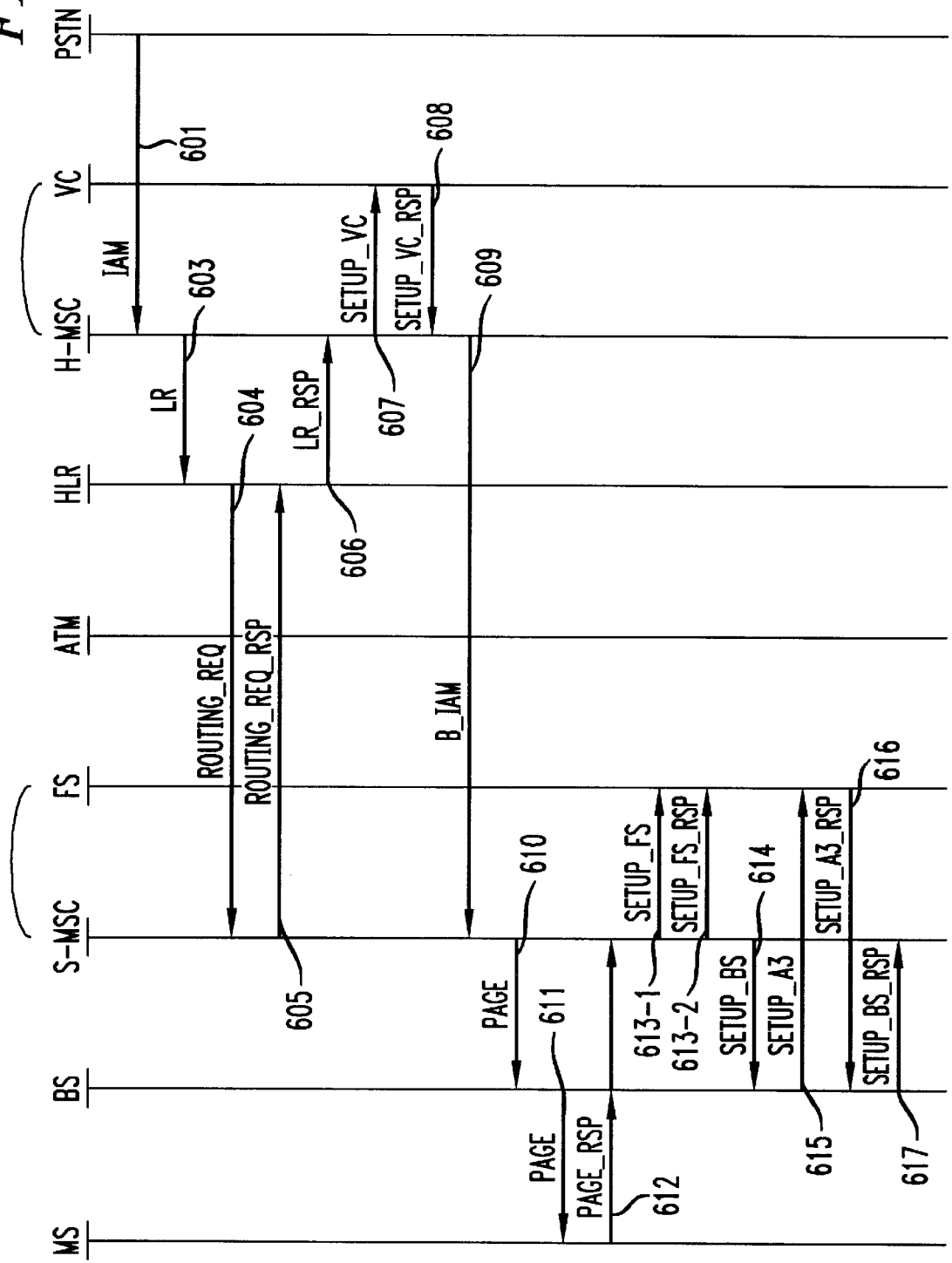

In a second illustrative example, assume that MSC 100 connects directly to PSTN 200 via, e.g., link 515. Also assume that MS 10 places a call to station S1 in the manner described above, i.e., by transmitting a call setup message that is received by base station 20-1 as represented by message 501 in FIG. 5. Similarly, BS 20-1 forwards the message (502) to MSC controller 105 via path 21-1. MSC controller 105 processes the received message/frame and determines the routing of the call from the called number. Specifically, MSC controller 105 determines in a conventional manner that the called station is served by PSTN 200 and that PSTN 200 may be reached directly via a one hop path/link 515. For that case, then, MSC 100 determines that it will have to interconnect a vocoder between MSC 100 and link 515 to "upcode" the 8 Kbps ADPCM voice information originated by MS 10 to a 64 kbps rate expected by PSTN 200. MSC controller 105 also determines in a conventional manner that the call is an IS-95 (CDMA) call, as discussed above. MSC controller 105 in response thereto selects a virtual path via packet switch 115 that may be used to connect an associated frame selector 120 to an associated vocoder 130. MSC controller 105 then sends a setup_FS (frame selector) message 503 to FS controller 110, in which the message contains, inter alia, the identity of the selected virtual path and call type (e.g., nominal 8 kbps ADCPM voice).

Similarly, FS controller 110 selects an idle frame selector, e.g., FS 120-2, as well as a channel (VCI) within the identified VP to the vocoder 130. FS controller 110 then returns a response message 504 to MSC controller 105 acknowledging that it will handle the call and identifying the selected channel (VCI) within the VP identified in message 503. Message 504 also contains the address of controller 110 and identity of the selected frame selector 120-2. MSC controller 105 then selects a trunk group that may be used to send 64 kbps voice information to PSTN 200 via path 515 and switch 140. MSC controller 105 then sends the (a) identity of the selected trunk group, (b) VPI/VCI that will be used to send voice messages from the selected frame selector 120-2 to the selected vocoder, (c) call type and (d) call mode in a setup_VC message 505 to VC controller 125. VC controller 125, responsive to receipt of the message, selects an idle vocoder, e.g., vocoder 130-1, and an idle channel in the selected trunk group to path 515. VC controller 125 then returns a setup_VC_RSP message 506 to controller 105 acknowledging that the latter channel may be used to communicate over the selected trunk group.

Following the foregoing, MSC controller 105 sends a setup_BS message 507 to the base station identifying FS controller 110. Message 507 also identifies the selected frame selector 120-2 that the base station may use to send control information to FS controller 110. Similarly, in response to receipt of message 507, the base station, e.g., base station 20-1, sends a setup_A3 message 508 to controller 110 identifying the voice channel that may be used between the base station 20-1 and FS 120-2 and specifying the adaptation layer protocol that base station 20-1 will use to communicate with FS 120-2. FS controller 110, in response to receipt of message 508, forms and returns a response message setup_A3_RSP 509 acknowledging the specified adaptation layer protocol. Base station 20-1 then sends a response message setup_BS_RSP 510 to MSC controller 105 acknowledging the connection.

At that point, MSC controller 105 forms an Initial Address Message (IAM) 511 containing the calling information, type of call (8 kbps ADPCM), ID of the selected trunk group and CIC connecting to path 515, and CPN and sends the message via signaling path 500 (e.g., the aforementioned SS7 signaling path) to the PSTN 200 switch connected to link 515, thereby completing the connection to PSTN 200 in accordance with the principles of the invention. Upon receipt of the IAM message, the PSTN 200 switch establishes a connection from itself to station S1, thereby completing the connection from MS 10 to station S1.

Figure 9:
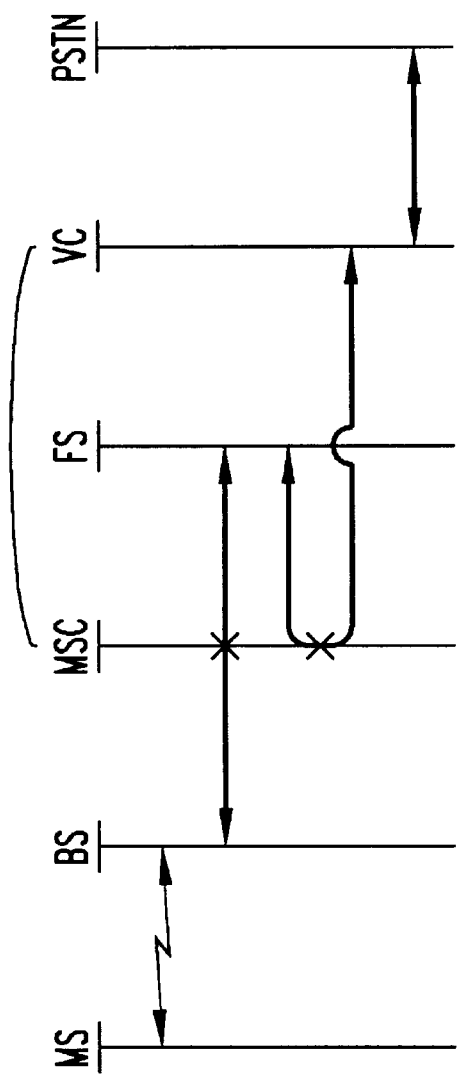

An illustrative rendition of the segments forming the above-described connection is shown in FIG. 9. The lines extending between arrowheads indicate segments of the end-to-end connection. The endpoints of these segments terminate either at the air interface, ATM connection or connection to the PSTN. An "x" indicates a point at which ATM switching occurs.

In a third illustrative example, assume that a user at a telephone station S2 served by PSTN 200 places a call to mobile station 10 in a conventional manner. A switch (not shown) in PSTN 200 handling the call routes the call, based on the Called Party Number (CPN), to the home MSC associated with the called mobile station 10, e.g., HMSC 400. The switch does this by first selecting a trunk group and an idle voice channel identified by a CIC in that group connecting to HMSC 400, and then sending to HMSC 400 an IAM message containing, inter alia, the trunk group ID, identity of the selected voice channel in that group and called party number. Upon receipt of the IAM message, HMSC 400 determines that MS 10 is being served by MSC 100 using standard mobility management protocols, such as IS41-MAP. HMSC 400 then forwards the call to the destination MSC 100 in a conventional manner. In doing so, HMSC 400 "down codes" the 64 kbps voice signals to 8 kbps rate.

(As an aside, as is well-known, an HLR is used to track the current locations of respective active mobile stations as reported by each Visitor Location Register (VLR) in the system. That, when a mobile station is located outside of its home region powers up, it registers with the base station currently serving the cell in which the mobile is located. The MSC serving (SMSC) that base station sends the location of the mobile to the associated VLR (not shown). The VLR, in turn, sends a registration message to the HLR associated with that mobile. Also, when a mobile leaves an area served by one MSC and enters an area served by another MSC, then the VLR associated with the latter MSC sends the current location of the mobile to the associated HLR. If the VLR serves both of those MSCs, then the VLR does not notify the HLR, but changes its data base to note the current location of the mobile. Thus, if a telephone call is placed to a mobile, then the home MSC sends a query to the associated HLR to obtain the location of the called mobile. The HLR, in turn, identifies the VLR now serving the mobile based on the contents of the home register associated with the mobile. The HLR then notifies the identified VLR via the associated signaling network 500 that a call is to be routed to the mobile. The identified VLR similarly notifies the MSC serving the zone in which the mobile is located. That MSC then returns a so-called Temporary Local Dialing Number (TLDN) that is to be used as the routing number in the routing of the call to that MSC. The VLR then sends the TLDN to the HLR, which then forwards the TLDN to the home MSC handling the call. (It is noted that a TLDN may be, e.g., the area code in which MSC 100 is located plus the exchange code associated with MSC 100 plus an arbitrary line code, e.g., 0000. The home MSC uses this number to route the connection to the serving MSC.))

Thus, in accordance with the foregoing, MSC 400 sends a location request (LR) 603 to the HLR, which, in turn, sends a routing request 604 to the SMSC/VLR 100, which responds to the HLR with message 605, which then returns the TLDN to switch 400 in message 606. HMSC 400 also determines from a stored operational profile of the called mobile that the called mobile is of the CDMA type, and notes that it will have to establish a connection to an idle frame selector associated with MSC 100. Before doing so, HMSC 400 interposes a CDMA vocoder in the connection to "down code" the 64 kbps voice signals that will be received from PSTN 200 to a 8–13 kbps voice signal. The down coded signal will then be forwarded to the MSC 100 frame selector, which will then send the signal to the base station(s) covering the cell(s) in which MS 10 is located e.g., base stations 20-1 and 20-x. Both of those base stations may then transmit the down coded signal to MS 10. Specifically, HMSC 400 selects a virtual path from its associated vocoder to frame selector 120 in MSC 100. HMSC 400 then sends a setup_VC message 607 to the VC controller in HMSC 400 identifying (i) a TGID AND CIC that will be used to receive the 64 kbps voice from PSTN 200, (ii) a VPI that will be used to output the down coded 8–13 kbps voice to MSC 100 via ATM switch 150-1 and (iii) call type, e.g., 8 kbps ADPCM. The HMSC 400 VC controller selects an idle vocoder and connects the vocoder to the incoming voice channel. That VC controller also selects an idle voice channel to MSC 100 in the identified virtual path; and then returns a setup_VC_RSP message 608 acknowledging the connection and identifying the selected virtual voice channel (VCI) to MSC 100.

HMSC 400 then forms a conventional B-IAM message 609 containing, inter alia, the (a) VPI/VCI within trunk 406 that will be used to send the "down coded" voice to MSC 100; (b) TLDN and (c) call type. HMSC 400 then sends the message to MSC 100 (MSC controller 105) via a conventional signaling path 500 to alert MSC 100 to the incoming call. Upon receipt of the message, MSC 100 (MSC controller 105) forms a page message 610 containing a Mobile Identification Number (MIN) derived from the TLDN to locate the base station 20-*i* serving the called mobile 10 and broadcasts the page message to each of its associated base stations 20-I. The base stations broadcast the page message as an alerting message 611 over predetermined radio channels. The called mobile responds to the broadcast page message 611 by transmitting a PAGE_RSP message 612 over the radio channel to a nearby base station, which, in turn, relays message 612 to MSC 100. MSC controller 105 then sends a setup_FS message 613-1 to FS controller 110, in which the message contains the incoming VPI/VCI from HMSC 400 via switch 150-1, and call type. FS controller 110, responsive to receipt of message 613-1, selects an idle one of its frame selectors, e.g., FS 120-4, and connects the selected frame selector to the incoming channel identified in message 613-1. FS controller 110 then responds to the setup_FS message by sending a setup_FS_RSP message 613-2 to MSC controller 105, in which the latter message contains the address of FS controller 110 and identity of the selected frame selector 120-4. MSC controller 105 then sends a setup_BS message 614 to base station 20-1. Similarly, base station 20-1 responds to receipt of message 614 by returning a setup_A3 message 615 to FS controller 110 acknowledging the connection, and specifying a voice channel and adaptation layer protocol that will be used to communicate with FS 120-4. FS controller 110, in response to receipt of message 615, forms a response message setup_A3_RSP 616 acknowledging the specified adaptation layer protocol. Base station 20-1 then sends a response message setup_BS_RSP 617 to MSC controller 105 acknowledging the connection.

(Note that the called station could be located in an area served by its Home MSC. In that case, then, the call connection would extend to a base station, e.g., one of the base stations 25-1 through 25-*k*, served by the HMSC.)

Figure 10:
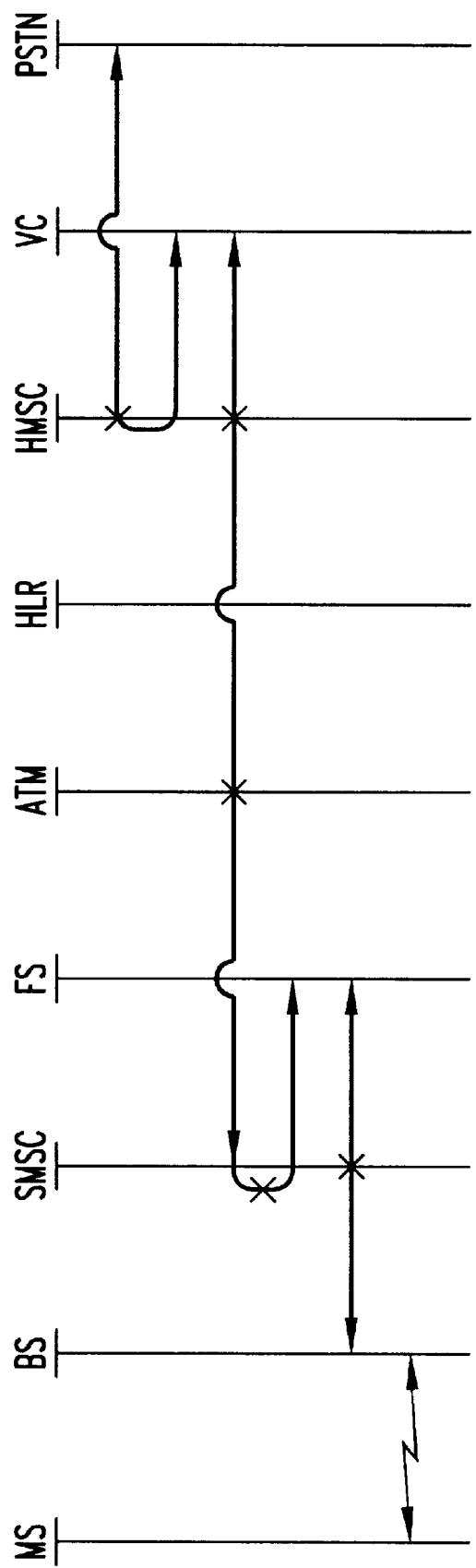

An illustrative rendition of the segments forming the above-described connection is shown in FIG. 10. The lines extending between arrowheads indicate segments of the end-to-end connection. The endpoints of these segments terminate either at the air interface, ATM connection or connection to the PSTN. An "x" indicates a point at which ATM switching occurs.

Figure 7:
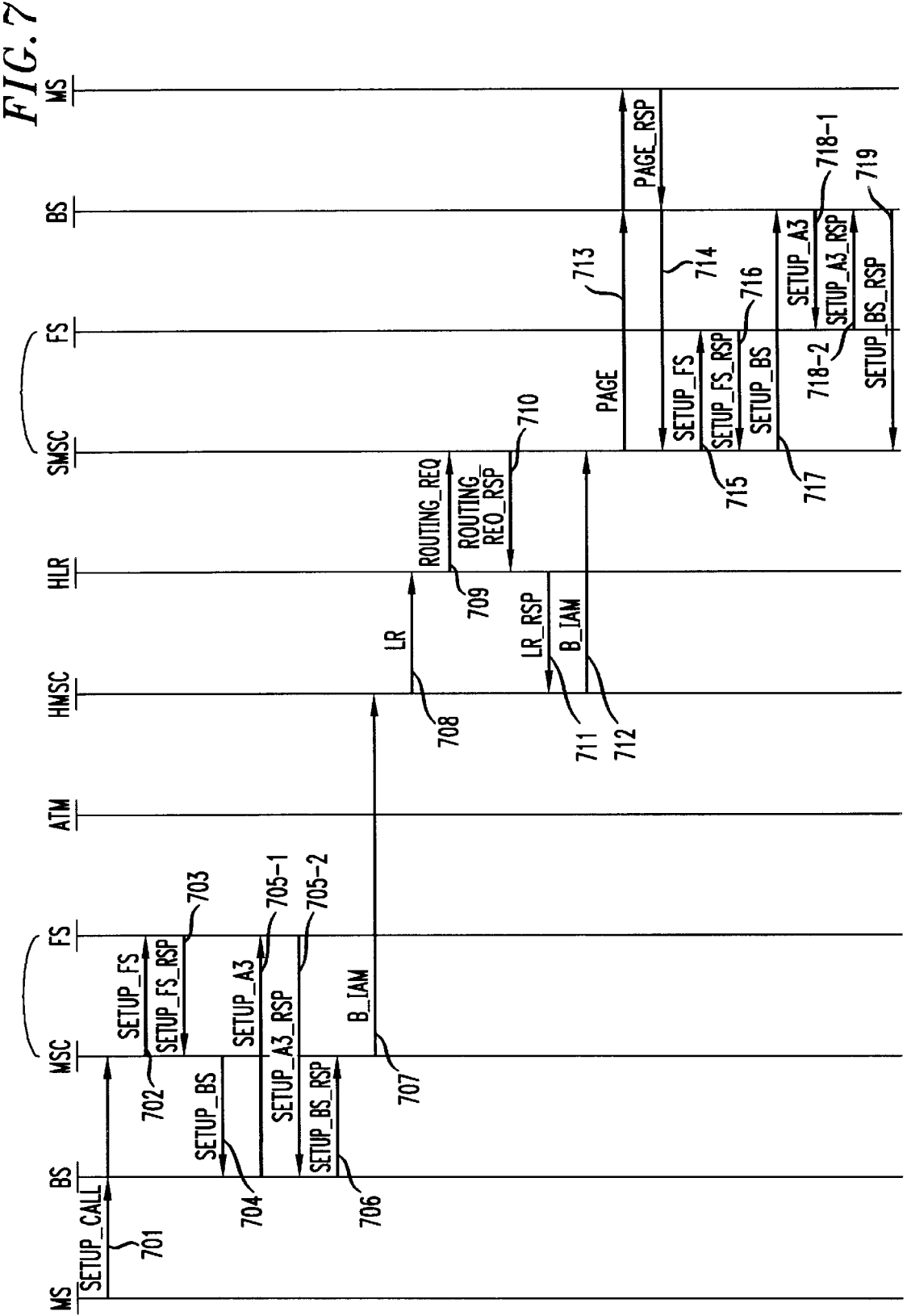

In a fourth illustrative example, assume that mobile station 10 places a call to another mobile station (not shown) served by a MSC (not shown) other than MSC 100 or 400. The flow of messages 701 through 719 illustrating the setting up of the call initiated by MS 10 is shown in FIG. 7. For clarity and brevity, a detailed description of FIG. 7 is not provided since the flow of messages shown therein is similar to that shown in the previous FIGs. It is sufficient to say at this point that, because the call does not involve PSTN 200, a vocoder, in accordance with an aspect of the invention, is not interposed in the connection between the two mobile stations. Note that FIG. 7, in essence, includes the case where the called mobile is located in an area served by its associated HMSC, which would eliminate the flow of messages from the HMSC to the serving MSC.

Figure 11:
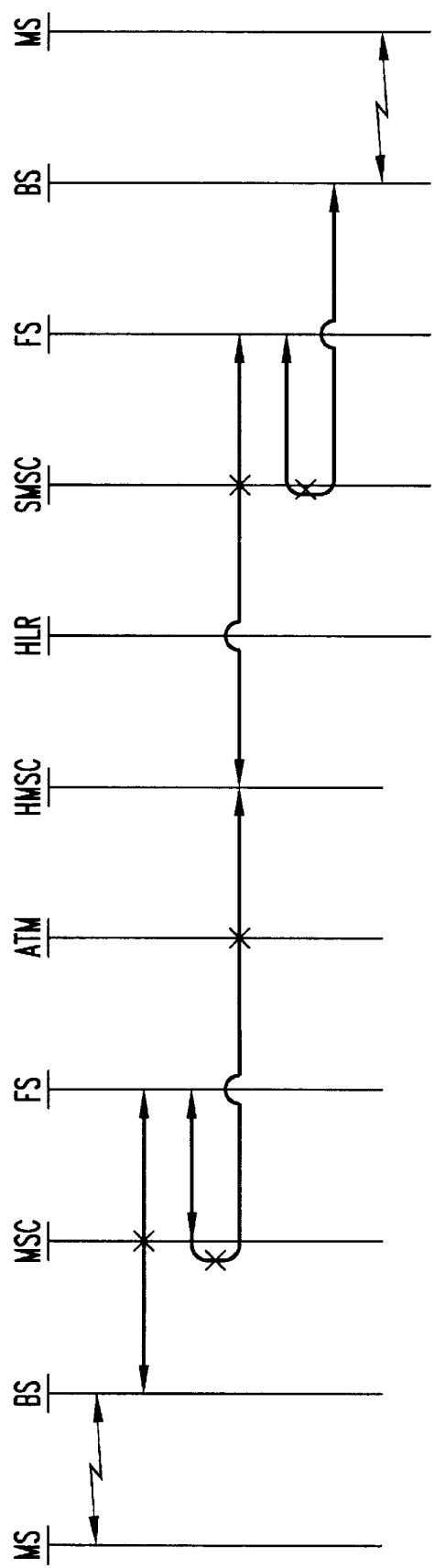

An illustrative rendition of the segments forming the above-described connection is shown in FIG. 11. The lines extending between arrowheads indicate segments of the end-to-end connection. The endpoints of these segments terminate either at the air interface, ATM connection or connection to the PSTN. An "x" indicates a point at which ATM switching occurs.

The foregoing is merely illustrative of the principles of the invention. Those skilled in the art will be able to devise numerous arrangements, which, although not explicitly shown or described herein, nevertheless embody those principles that are within the spirit and scope of the invention. For example, besides CDMA, the claimed invention may be used in systems employing other transmission protocols, e.g., TDMA, GSM, etc. As another example, although the invention was discussed in the context of using an ATM network in the routing of calls from an MSC to PSTN 200, it is clear that other types of digital networks that can handle 8 to 13 kbps compressed voice may be used instead.

We claim:

1. A telecommunications system for efficiently routing digital information from a first network comprising a plurality of mobile switching centers to a second Public Switched Telephone Network (PSTN), said telecommunications system comprising apparatus at a first one of said mobile switching centers for receiving digital information at a first rate from a source, the digital information including information destined for the PSTN, a third network comprising a plurality of packet switches each operative for routing packets composed of data received at said first data rate, and wherein said one mobile switching center further comprises apparatus, responsive to receipt of the digital information from said source and responsive to an absence of a direct connection from the one mobile switching center to the PSTN, for selecting a connection to one of the packet switches that may be used to forward the received digital information to the PSTN and forwarding the received digital information to said one of the packet switches via the selected connection, and wherein said one packet switch includes apparatus operative for forwarding said digital information to the PSTN at a second data rate over a direct connection to the PSTN.

2. The system of claim 1 wherein said apparatus in said one packet switch is further operative in the event that said direct connection is not present for forwarding the digital information to another one of the packet switches having a direct connection to the PSTN, said other one of the packet switches then converting the digital information to said second rate and forwarding the converted digital information to the PSTN.

3. The system of claim 1 wherein said digital information is nominally 8 kbps ADPCM voice signals and said second rate is 64 kbps.

4. The system of claim 1 wherein said apparatus responsive to receipt of the digital information from said source includes apparatus which, responsive to a presence of a direct connection to the PSTN, forwards said digital information to the PSTN at a second data rate over that direct connection.

5. The system of claim 1 wherein said digital information is a request to establish a telephone connection to a telephone station served by the PSTN.

6. The system of claim 1 wherein said one mobile switching center further comprises at least one frame selector for selecting between the same digital information respectively received from at least two different sources operating in accordance with a predetermined protocol and forwarding the selected digital information to said one packet switch.

7. The system of claim 1 wherein said one mobile switching center apparatus includes apparatus, responsive to determining that said one mobile switching center may forward received digital information to the PSTN via a direct connection, for converting said digital information from said first rate to said second rate and forwarding the converted digital information to the PSTN via the direct connection.

8. The system of claim 1 wherein said connection to said one of said packet switches is a logical connection identified by a respective virtual path identifier and associated virtual circuit identifier.

9. A telecommunications system for efficiently routing digital information from a first network comprising a plurality of mobile switching centers to a second Public Switched Telephone Network (PSTN), in which one of the mobile switching centers receives the digital information from a source at a first data rate and in which the PSTN expects to receive the digital information at a second rate, said telecommunications system comprising a third network comprising a plurality of packet switches each operative for routing packets composed of data received at said first data rate, and wherein said one mobile switching center comprises apparatus, responsive to receiving said digital information from said source and responsive to determining an absence of a direct connection from the one mobile switching center to the PSTN, for selecting a connection to one of the packet switches that may be used to forward the received digital information to the PSTN and forwarding the digital information and digital information subsequently received from said source to said one of the packet switches, and wherein said one packet switch comprises apparatus, responsive to receiving the digital information from said one mobile switching center, for selecting an output to forward the received digital information to its intended destination and supplying the received digital information at the second data rate to the selected output if that output connects directly to the PSTN, otherwise supplying the received digital information to the selected output at the first data rate for receipt by another one of the packet switches.

10. The system of claim 9 wherein said digital information is a request to establish a telephone connection to a telephone station served by the PSTN.

11. The system of claim 9 wherein said first data rate is 8 kbps to 13 kbps and said second data rate is nominal 64 kbps.

12. The system of claim 9 wherein said one mobile switching center further comprises at least one frame selector for selecting between the same digital information respectively received from at least two different sources operating in accordance with a predetermined protocol and forwarding the selected digital information to said one of said packet switches.

13. The system of claim 9 wherein said one mobile switching center apparatus includes apparatus, responsive to determining that said one mobile switching center may forward received digital information to the PSTN via a direct connection, for converting said digital information from said first rate to said second rate and forwarding the converted digital information to the PSTN via the direct connection.

14. The system of claim 9 wherein said connection to said one of said packet switches is a logical connection identified by a respective virtual path identifier and associated virtual circuit identifier.

15. A method of operating a mobile switching center comprising the steps of responsive to receiving from a mobile station a request for a call connection that will be completed by a Public Switched Telephone Network (PSTN), establishing a connection from the mobile switching center either (a) directly to the PSTN or (b) to a packet network, wherein the packet network includes one or more packet switches and a first one of said one or more packet switches is directly connected to the PSTN, determining if said connection from the mobile switching center is (a) a direct connection to the PSTN or (b) a connection to the packet network, inserting a vocoder in the connection from the mobile switching center to the PSTN only if that connection connects directly to the PSTN, and inserting a vocoder in the direct connection between the first packet switch and the PSTN if the mobile switching center connection is to the packet network.

16. The system of claim 2 wherein said apparatus in said one packet switch forwards the digital information to said another one of the packet switches having a direct connection to the PSTN via an associated channel provided by a signaling network.

17. The system of claim 1 wherein the output of said apparatus in said one packet switch is provided to said another one of the packet switches by an associated channel provided by a signaling network.

* * * * *